Nov. 4, 1952
A. BRANDT
2,616,182
GAUGE
Filed Nov. 7, 1951
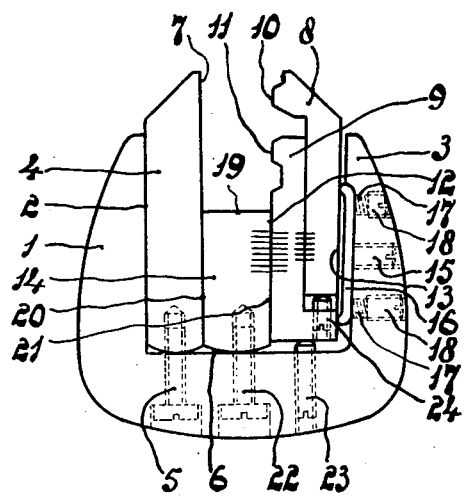
INVENTOR
Adrianus Brandt
By *Fred M. Vogel*
Agent Patented Nov. 4, 1952

2,616,182

UNITED STATES PATENT OFFICE 2,616,182

GAUGE

Adrianus Brandt, Eindhoven, Netherlands, assignor to Hartford National Bank and Trust Company, Hartford, Conn., as trustee Application November 7, 1951, Serial No. 255,164

4 Claims. (Cl. 33—168)

This invention relates to improvements in or relating to adjustable and readjustable gauges by which the gauge can be set and reset easily and inexpensively. The adjustability also permits resetting of the difference between the "go" and "no go" measuring points.

It has been proposed to construct adjustable gauges for determining at least two reference measurements, in which the measuring points associated with each reference measurement are provided on two gauge parts located on both sides of the opening of the gauge. One gauge part comprises two or more projections each of which carries a measuring point at the end. In this case, the plane through the measuring points on this gauge portion makes an angle with the plane on which the measuring points of the other gauge portion lie, the measuring points on the projections in this plane being displaceable with regard to the other gauge part in such manner that the angle between the two planes remains constant. If in such a construction, one reference measurement is the "go" side and the second reference measurement is the "no go" side of the gauge, it will be appreciated that the difference in measurement between "go" and "no go" is only determined by the spacing of the measuring points concerned on the said gauge part. Hence, the gauge is suitable only for a definite difference between "go" and "no go."

In practice it may be desirable that a gauge of this type should be adjustable not only to the correct "go" and "no go" measure, but also that the difference between "go" and "no go" should be adjustable. In other words, the gauge should permit a different tolerance to be adjusted. According to the invention, this is achieved in a simple manner by providing the gauge of the aforesaid type with means for changing the mutual spacing between the measuring points of at least two projections.

In an advantageous embodiment of the invention, distance variation between the measuring points is possible in a simple manner by subdividing the gauge part furnished with projections, each component part carrying one or more projections and the limiting surface between the component parts being preferably parallel to the plane comprising the measuring points, while the said component parts are adjustable with regard to each other. If the limiting surfaces are not parallel to the plane comprising the measuring points, the advantage of a greater degree of adjustability is obtained. If the said planes are parallel, the manufacture is comparatively simple. Since, moreover, the angle between the gauge parts is constant it is possible to provide one of the parts with a graduation so that complicated measurements for adjusting the tolerance can be dispensed with. As a matter of fact, a comparatively large displacement of one component part of the gauge with regard to the other part only results in a small increase or decrease in difference between the "go" and "no go" side.

A further feature of the invention is a wedge-shaped member, one converging surface of which is always parallel to the plane of each gauge part comprising the measuring points. The displacement of one gauge part with regard to the other is then effected by displacing this gauge part with regard to the wedge parallel to one of the converging surfaces of the wedge. This yields a simple construction which, moreover, entails little difficulty in manufacture.

An additional advantage is that the wedge may be composed of a standard measuring block and a separate wedge. The latter may, if desired, be replaced by a member the slope of one surface of which is slightly different from that of the other surface. By this construction and subdivision of the gauge part concerned, the adjustability of the difference between the reference measurements is doubled.

Furthermore it is advantageous that, according to a further embodiment of the invention, the surfaces with which the gauge parts engage the sides of the wedge coincide with the planes comprising the measuring points.

In order that the invention may be more clearly understood and readily carried into effect, it will now be described more fully with reference to the accompanying drawing, representing, by way of example one embodiment thereof.

The reference numeral 1 denotes a U-shaped gauge body whose inner surface 2 is surface ground. In this gauge body, a part 4 engages the surface 2 and is tightly drawn against the bottom 6 of the gauge body by means of a screw 5. The inner side 7 of the gauge part 4 is surface ground and forms the measuring points of this gauge part. At the other side 3 of the gauge body there is provided a gauge part consisting of two parts 8 and 9. Both parts have measuring surfaces 10 and 11, respectively. The separating surface between parts 8 and 9 is parallel to the plane comprising the measuring surfaces 10, 11 and a surface 12 with which the part 9 engages a wedge-shaped member 14 referred to later. The component part 8 of the gauge has a surface 13 which is preferably also parallel to the said separating surface. By means of a screw 15 a clasp 16 is pressed against the said surface 13. This clasp is acted upon by two springs 17 engaged by screws 18. The wedge 14 has two surfaces 19 and 20 together making a right angle, the third surface 21 forming an angle with the surface 20. This third surface 21 is engaged by the surface 12 of component part 9. The wedge 14 is held by a screw 22. The component part 9 is supported by a screw 23, a second screw 24 determining the position of part 8 with regard to part 9.

If the measuring points extending in the planes 7, 10, 11 become worn, the screw 15 is loosened. Subsequently the screw 23 is slightly loosened to permit a slight movement of the measuring side 8, 9 along the wedge 14. If the slope of the surface 21 relative to the surface 20 be sufficiently small, say, 1 to 500, a comparatively large displacement of the gauge part consisting of the component parts 8 and 9, along the wedge 14 corresponds to a very slight variation of the two reference measurements. It will be appreciated that in spite of this variation the difference between the two reference measurements remains constant. If, however, it is desired, either in service or on readjustment of the gauge, to alter the difference between "go" and "no go," this can be accomplished by a slight rotation of screw 24. By this rotation, the spacing between the measuring points extending in the measuring planes 10 and 11 is changed to the desired difference.

The wedge 14 and the component part 9 may be provided with a graduation which permits the gauge to be adjusted accurately. A graduation may also be provided on part 9 and a corresponding graduation on part 8, the last-mentioned graduation permitting the difference in measurement, between the "go" and "no go" side to be adjusted.

In the embodiment represented, the gauge part concerned consists of two component parts 8 and 9 each carrying a projection. Fundamentally, however, this gauge portion may consist of more component parts each furnished with a projection and all component parts being adjustable relative to one another. Alternatively, for example, one of the component parts may be provided with two projections, the other component part having only one projection. The latter may be advantageous if the gauge is provided with a preliminary reference measurement.

Of course, the measuring parts on the gauge portions may alternatively be located on rollers which are carried by the gauge portions and may, if desired, have a given profile, for example, a screw thread.

What I claim is:

1. An adjustable gauge for determining at least two reference measurements, said gauge comprising a U-shaped housing, a first gauge part positioned within one side of said housing, a second gauge part positioned within the other side of said housing, said first gauge part having at least two projections thereon, each projection carrying a measuring point, measuring points on said second gauge part, the plane through the measuring points on said first gauge part making a constant angle with the plane in which the measuring points on said second gauge part are located, means to displace the measuring points on the projections of said first gauge part in the said plane in which they are located to change the reference measurements, and means to change the relative spacing between the measuring points on said projections.

2. An adjustable gauge for determining at least two reference measurements, said gauge comprising a U-shaped housing, a first gauge part positioned within one side of said housing, a second gauge part positioned within the other side of said housing opposite said first part, said first gauge part comprising two component parts, each of said component parts having a projection thereon which faces said second gauge part, each projection carrying a measuring point, measuring points on said second gauge part opposite said measuring points on said first gauge part, the plane through the measuring points on said first gauge part making a constant angle with the plane in which the measuring points on said second gauge part are located, the separating surfaces between the component parts being parallel to this plane through the measuring points on said first gauge part, means to displace the measuring points on the projections of said first gauge part in the said plane in which they are located to change the reference measurements, and means to move said component parts relative to each other to change the relative spacing between the measuring points on said projections.

3. An adjustable gauge for determining at least two reference measurements, said gauge comprising a U-shaped housing, a first gauge part positioned within one side of said housing, a second gauge part positioned within the other side of said housing opposite said first part, an intermediate wedge-shaped member between said two parts, said member having two converging surfaces, said first gauge part having at least two projections thereon which face said second gauge part, each projection carrying a measuring point, measuring points on said second gauge part opposite said measuring points on said first gauge part, the plane through the measuring points on said first gauge part making a constant angle with the plane in which the measuring points on said second gauge part are located, one converging surface of said wedge always being parallel to the plane of each gauge part comprising the measuring points, means to displace one gauge part relative to the other gauge part by moving it parallel to one of said converging surfaces of said wedge to change the reference measurements, and means to change the relative spacing between the measuring points on said projections.

4. An adjustable gauge for determining at least two reference measurements, said gauge comprising a U-shaped housing, a first gauge part positioned within one side of said housing, a second gauge part positioned within the other side of said housing opposite said first part, an intermediate wedge-shaped member between said two parts, said member having two converging surfaces, said first gauge part having at least two projections thereon which face said second gauge part, each projection carrying a measuring point, measuring points on said second gauge part opposite said measuring points on said first gauge part, the plane through the measuring points on said first gauge part making a constant angle with the plane in which the measuring points on said second gauge part are located, the surfaces with which the gauge parts engage the sides of the wedge coincide with the planes comprising the measuring points, means to displace the measuring points on the projections of said first gauge part in the said plane in which they are located to change the reference measurements, and means to change the relative spacing between the measuring points on said projections.

ADRIANUS BRANDT.

No references cited.